(12) United States Patent
Chang et al.

(10) Patent No.: US 12,499,569 B2
(45) Date of Patent: Dec. 16, 2025

(54) MEASUREMENT CARD, MEASUREMENT SYSTEM AND MEASUREMENT METHOD USING THE SAME

(71) Applicant: INDUSTRIAL TECHNOLOGY RESEARCH INSTITUTE, Hsinchu (TW)

(72) Inventors: Yu-Wei Chang, Kaohsiung (TW); Shih-Fang Yang Mao, Zhubei (TW); Tien-Yan Ma, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 511 days.

(21) Appl. No.: 18/098,493

(22) Filed: Jan. 18, 2023

(65) Prior Publication Data

US 2024/0112360 A1  Apr. 4, 2024

(30) Foreign Application Priority Data

Sep. 30, 2022  (TW) .................................. 111137291

(51) Int. Cl.
*G06T 7/60* (2017.01)
*G01B 11/00* (2006.01)
(Continued)

(52) U.S. Cl.
CPC .................. *G06T 7/60* (2013.01); *G06T 7/73* (2017.01); *G06T 7/90* (2017.01); *G06V 10/25* (2022.01); *G06V 10/56* (2022.01); *G06T 2207/10024* (2013.01); *G06T 2207/30108* (2013.01); *G06T 2207/30204* (2013.01)

(58) Field of Classification Search
USPC ......................................... 382/100, 141, 165
See application file for complete search history.

(56) References Cited

U.S. PATENT DOCUMENTS

| 4,631,676 A | 12/1986 | Pugh |
| 5,831,260 A | 11/1998 | Hansen |

(Continued)

FOREIGN PATENT DOCUMENTS

| CN | 2833602 Y | 11/2006 |
| CN | 103797485 A | 5/2014 |

(Continued)

OTHER PUBLICATIONS

Taiwanese Office Action and Search Report dated Oct. 31, 2023 for Application No. 111137291.

(Continued)

*Primary Examiner* — Ishrat I Sherali
(74) *Attorney, Agent, or Firm* — Birch, Stewart, Kolasch & Birch, LLP (57) ABSTRACT

A measurement system includes a camera and a processor. The camera is configured to capture a measurement card image of a measurement card, and the measurement card image includes a number of feature pattern images. The processor is electrically connected to the camera and configured for analyzing the feature pattern images to obtain a feature point coordinate of a feature point of each feature pattern image, and inputting the feature point coordinates into a conversion matrix to obtain a tip coordinate of a tip of the measurement card.

13 Claims, 9 Drawing Sheets

(51) Int. Cl.
  *G06T 7/73* (2017.01)
  *G06T 7/90* (2017.01)
  *G06V 10/25* (2022.01)
  *G06V 10/56* (2022.01)

(56) References Cited

U.S. PATENT DOCUMENTS

| | | | |
|---|---|---|---|
| 6,005,548 | A | 12/1999 | Latypov et al. |
| 8,913,125 | B2* | 12/2014 | Chang ............... G01B 21/04 356/51 |
| 8,937,628 | B2* | 1/2015 | Hatcher ............ G06F 3/0425 345/581 |
| 9,009,000 | B2* | 4/2015 | York ............... G01B 21/047 33/503 |
| 9,043,146 | B2* | 5/2015 | Troy ................ G06F 17/16 701/519 |
| 9,381,417 | B2 | 7/2016 | Inoue |
| 9,621,793 | B2* | 4/2017 | Furihata ........... G01B 11/2522 |
| 9,628,775 | B2* | 4/2017 | Bridges .............. G01B 5/012 |
| 9,733,072 | B2* | 8/2017 | Kuwabara .......... G06T 7/521 |
| 9,934,564 | B2* | 4/2018 | Tat ..................... G06T 7/33 |
| 10,401,144 | B2* | 9/2019 | Pettersson ......... G01B 11/005 |
| 10,497,111 | B2* | 12/2019 | Hirota .............. H04W 84/02 |
| 2007/0142177 | A1 | 6/2007 | Simms et al. |
| 2010/0076721 | A1 | 3/2010 | Simms et al. |
| 2014/0379135 | A1 | 12/2014 | Kristiansen et al. |
| 2015/0051718 | A1 | 2/2015 | Inoue |
| 2015/0116472 | A1 | 4/2015 | Li et al. |
| 2017/0332956 | A1 | 11/2017 | Bigolin et al. |
| 2019/0192908 | A1 | 6/2019 | Chang |
| 2020/0049486 | A1* | 2/2020 | Christine ........... G01B 5/008 |
| 2021/0308523 | A1 | 10/2021 | Chang et al. |
| 2022/0004796 | A1 | 1/2022 | Manako et al. |
| 2022/0097234 | A1* | 3/2022 | Huang ............... B25J 9/1692 |

FOREIGN PATENT DOCUMENTS

| | | |
|---|---|---|
| CN | 105894068 A | 8/2016 |
| CN | 104574436 B | 10/2017 |
| CN | 107476358 A | 12/2017 |
| CN | 111709999 A | 9/2020 |
| CN | 112428265 A | 3/2021 |
| CN | 114820817 A | 7/2022 |
| EP | 2 865 330 A1 | 4/2015 |
| EP | 3 240 480 B1 | 10/2018 |
| EP | 2 837 329 B1 | 11/2019 |
| EP | 3 889 020 A1 | 10/2021 |
| JP | 2018-105778 A | 7/2018 |
| TW | 201515635 A | 5/2015 |
| TW | I535419 B | 6/2016 |
| TW | I643092 B | 12/2018 |
| TW | 201928886 A | 7/2019 |
| TW | 202028692 A | 8/2020 |
| TW | I721254 B | 3/2021 |

OTHER PUBLICATIONS

Leavitt et al., "Simple seat height adjustment in bike fitting can reduce injury risk", Clinical Pearls, May/Jun. 2016, vol. 15, No. 3, p. 130.

Lin et al., "Achievement of accurate robotic arm-based bike frame quality check using 3D geometry mathematical model", Applied Sciences, 2019, vol. 9, 5355, total 17 pages.

Moore et al., "Accurate measurement of bicycle parameters", Proceedings, Bicycle and Motorcycle Dynamics 2010 Symposium on the Dynamics and Control of Single Track Vehicles, Oct. 20-22, 2010, Delft, The Netherlands, pp. 1-23.

Redfield, "Bike braking vibration modelling and measurement", Procedia Engineering, 2014, vol. 72, pp. 471-476.

* cited by examiner

MEASUREMENT CARD, MEASUREMENT SYSTEM AND MEASUREMENT METHOD USING THE SAME

This application claims the benefit of Taiwan application Serial No. 111137291, filed Sep. 30, 2022, the subject matter of which is incorporated herein by reference.

TECHNICAL FIELD

The invention relates to a measurement card, a measurement system and a measurement method using the same.

BACKGROUND

After a product is completed, a subsequent quality inspection, such as size measurement, is usually required. However, for a three-dimensional (3D) product, components in the product may extend along different directions in space, and it results in labor-intensive and time-consuming dimensional measurement. Therefore, how to improve the aforementioned problems is one of the goals of those skilled in the art.

SUMMARY

In an embodiment of the present disclosure, a measurement card is provided. The measurement card includes a main body and a plurality of feature patterns. The main body has a lateral edge and a tip opposite to the lateral edge. The feature patterns are formed on the main body. The feature patterns satisfy at least one of the following (1) and (2): (1). there is a first interval between a first-one and a second-one of the feature patterns in a reference axis passing through the lateral edge and the tip, there is a second interval between the second-one and a third-one of the feature patterns in the reference axis, wherein the second interval is different from the first interval; (2). the feature patterns are asymmetrically arranged with respect to the reference axis.

In another embodiment of the present disclosure, a measurement system includes a camera and a processor. The camera is configured for capturing a measurement card image of a measurement card, the measurement card includes a main body and a plurality of feature patterns, wherein the main body has a lateral edge and a tip opposite to the lateral edge, the feature patterns are formed on the main body, and the feature patterns satisfy at least one of the following (1) and (2): (1). there is a first interval between a first-one and a second-one of the feature patterns in a reference axis passing through the lateral edge and the tip, there is a second interval between the second-one and a third-one of the feature patterns in the reference axis, wherein the second interval is different from the first interval; (2). the feature patterns are asymmetrically arranged with respect to the reference axis; the measurement card image includes a plurality of feature pattern images corresponding to the feature patterns. The processor electrically is connected to the camera and configured to analyze the feature pattern images to obtain a feature point coordinate of a feature point of each of the feature pattern images; and input the feature point coordinates into a transformation matrix to obtain a tip coordinate of the tip.

In another embodiment of the present disclosure, a measurement method includes the following steps: capturing a measurement card image of a measurement card by a camera, wherein the measurement card includes a main body and a plurality of feature patterns, wherein the main body has a lateral edge and a tip opposite to the lateral edge, the feature patterns are formed on the main body, and the feature patterns satisfy at least one of the following (1) and (2): (1). there is a first interval between a first-one and a second-one of the feature patterns in a reference axis passing through the lateral edge and the tip, there is a second interval between the second-one and a third-one of the feature patterns in the reference axis, wherein the second interval is different from the first interval; (2). the feature patterns are asymmetrically arranged with respect to the reference axis; the measurement card image includes a plurality of feature pattern images corresponding to the feature patterns; analyzing the feature pattern images to obtain a feature point coordinate of a feature point of each of the feature pattern images; and inputting the feature point coordinates into a transformation matrix to obtain a tip coordinate of the tip.

The above and other aspects of the disclosure will become better understood with regard to the following detailed description of the preferred but non-limiting embodiment (s). The following description is made with reference to the accompanying drawings.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION OF PREFERRED EMBODIMENTS

Refer to FIGS. 1A to 1H, FIGS. 1A to 1H show schematic diagrams of a plurality of measurement cards 10 to 80 according to a plurality of embodiments of the present disclosure.

Figure 1A:
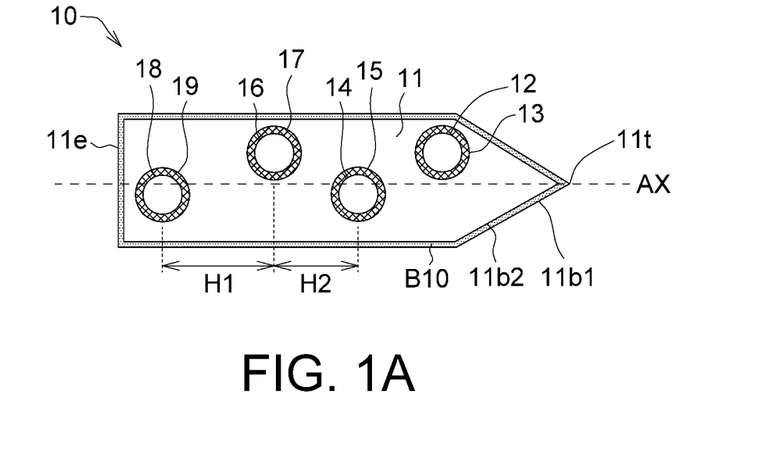
FIGS. 1A to 1H show schematic diagrams of a plurality of measurement cards according to a plurality of embodiments of the present disclosure.

As shown in FIG. 1A, the measurement card 10 includes a main body 11, a plurality of feature patterns 12 to 19 and a background pattern B10. The body 11 has a lateral edge 11e and a tip 11t opposite to the lateral edge 11e. The feature patterns 12 to 19 satisfy at least one of the following (1) and (2): (1). there is a first interval H1 between a first-one and a second-one of the feature patterns 12 to 19 in a reference axis AX passing through the lateral edge 11e and the tip 11t, there is a second interval H2 between the second-one and a third-one of the feature patterns 12 to 19 in the reference axis AX, wherein the second interval H2 is different from the first interval H1, (2). the feature patterns 12 to 19 are asymmetrically arranged with respect to the reference axis AX. As a result, a geometrical relationship of the feature patterns 12 to 19 with respect to the tip 11t (for example, an arrangement order with respect to the tip 11t) may be recognized. For example, through the relative geometric relationship of the feature patterns 12 to 19, it may obtain the feature patterns 12 and 13 adjacent to the tip 11t, and thus the arrangement order of the feature patterns 12 to 19 with respect to the tip 11t may be obtained.

In addition, a transformation relationship between the feature patterns 12 to 19 and the tip 11t is known or given, so when the geometric information (for example, coordinates of feature pattern images) of the feature patterns 12 to 19 is obtained, the geometric information of the tip 11t, for example, a tip coordinate of the tip 11t, may be obtained through the transformation relationship.

As shown in FIG. 1A, the main body 11 has, for example, an arrow shape having the tip 11t. The main body 11 is, for example, a plate body having a thickness of 3 millimeters (mm) to 5 mm.

In addition, the aforementioned first-one, second-one and third-one are, for example, any different three of the feature patterns 12 to 19.

In terms of number, as shown in FIG. 1A, the number of the feature patterns is at least four. In an embodiment, the number of the feature patterns is, for example, eight.

In terms of the arrangement form, as shown in FIG. 1A, the feature patterns 12 to 19 may be arranged sparsely and densely along the reference axis AX. For example, in comparison with the feature patterns 12 to 15 being arranged more densely, the feature patterns 16 to 19 are arranged more sparsely. In an embodiment, the feature patterns are asymmetrically arranged with respect to the reference axis AX. For example, it is not possible to find a vertical axis (perpendicular to the reference axis AX) which makes the feature patterns 12 to 19 be arranged symmetrically with respect to the vertical axis and/or it is not possible to find a horizontal axis (parallel to the reference axis AX) which makes the feature patterns 12 to 19 be arranged symmetrically with respect to the horizontal axis. In addition, both of the feature patterns may at least partially overlap. For example, the feature patterns 12 and 13 overlap, the feature patterns 14 and 15 overlap, the feature patterns 16 and 17 overlap, and the feature patterns 18 and 19 overlap.

In terms of grayscale values, as shown in FIG. 1A, one of the overlapping two feature patterns has a first grayscale value, and a region between the overlapping two feature patterns has a second grayscale value different from the first grayscale value. For example, a grayscale difference between the first grayscale value and the second grayscale value is at least 200, but may also be less than 200. The greater the grayscale difference, the stronger the contrast between the overlapping two feature patterns, and the more accurate the subsequent image analysis. In the present embodiment, the first grayscale value is greater than the second grayscale value. For the overlapping feature patterns 12 and 13, the feature pattern 12 is an inner circle of white (the first grayscale value is 255), while the feature pattern 13 is an outer circle, and an annular area between the feature patterns 12 and 13 is black (the second grayscale value is 0). The overlapping feature patterns 14 and 15, the overlapping feature patterns 16 and 17, and the overlapping feature patterns 18 and 19 have the same or similar features, and they will not be repeated here.

As shown in FIG. 1A, the overlapping two feature patterns may be concentrically arranged. For example, the overlapping feature patterns 12 and 13 are concentric, the overlapping feature patterns 14 and 15 are concentric, the overlapping feature patterns 16 and 17 are concentric, and the overlapping feature patterns 18 and 19 are concentric. In another embodiment, the overlapping feature patterns may be concentrically arranged in one feature pattern group, and the overlapping feature patterns may be eccentrically arranged in another feature pattern group.

As shown in FIG. 1A, the background pattern B10 is, for example, an edge frame of the main body 11. For example, the main body 11 has an outer boundary line 11b1 and an inner boundary line 11b2, wherein a region between the outer boundary line 11b1 and the inner boundary line 11b2 is defined as the background pattern B10. The background pattern B10 surrounds the feature patterns 12 to 19. The background pattern B10 may be filled with the first color. The first color may be selected as the least common color or less common color in the application scene. As a result, when analyzing the image, the obtained background pattern B10 has high boundary accuracy. In an embodiment, the first color may be green, for example, but other colors may also be used. Green is the most sensitive for the camera's image sensors, and it requires merely a small amount of light to illuminate green and clearly identify green areas.

Figure 1B:
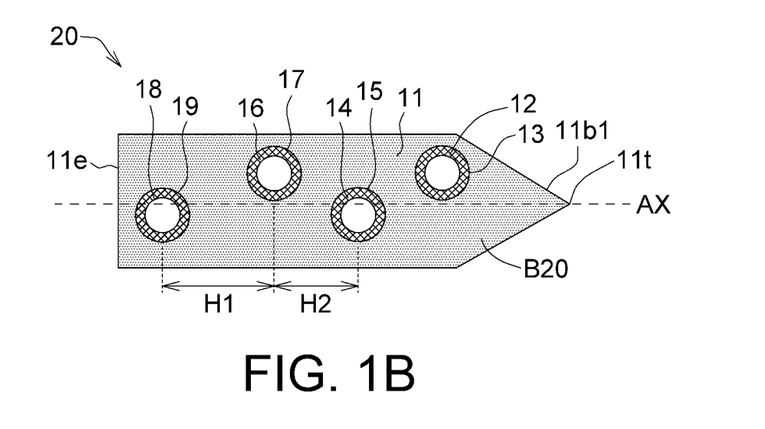

As shown in FIG. 1B, a measurement card 20 includes the main body 11, a plurality of the feature patterns 12 to 19 and a background pattern B20. The body 11 has the lateral edge 11e and the tip 11t opposite to the lateral edge 11e. The feature patterns 12 to 19 satisfy at least one of the following (1) and (2): (1). there is the first interval H1 between the first-one and the second-one of the feature patterns 12 to 19 in the reference axis AX passing through the lateral edge 11e and the tip 11t, there is the second interval H2 between the second-one and the third-one of the feature patterns 12 to 19 in the reference axis AX, wherein the second interval H2 is different from the first interval H1, (2). the feature patterns 12 to 19 are asymmetrically arranged with respect to the reference axis AX. As a result, the geometrical relationship of the feature patterns 12 to 19 with respect to the tip 11t may be recognized. In addition, the first-one, the second-one and the third-one of the present embodiment are, for example, any different three of the feature patterns 12 to 19. In the present embodiment, a region between the outer boundary line 11b1 of the measurement card 20 and the feature patterns 12-19 is defined as the background pattern B20. The background pattern B20 is filled with the first color, such as green or other color.

Figure 1C:
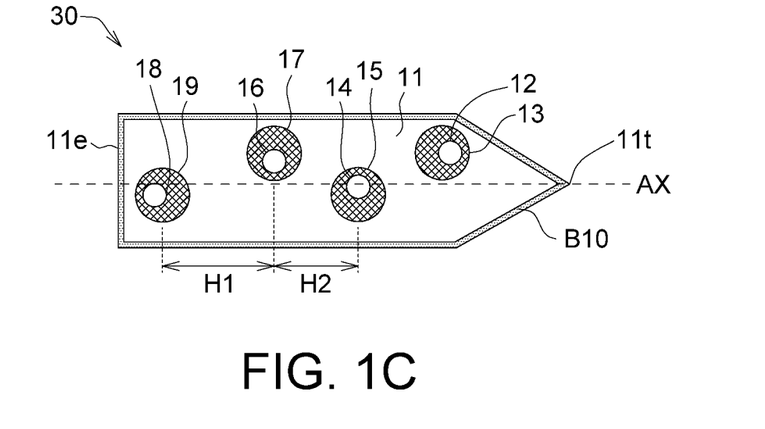

As shown in FIG. 1O, a measurement card 30 includes the main body 11, a plurality of the feature patterns 12 to 19 and the background pattern B10. The main body 11 has the lateral edge 11e and the tip 11t opposite to the lateral edge 11e. The feature patterns 12 to 19 satisfy at least one of the following (1) and (2): (1). there is the first interval H1 between the first-one and the second-one of the feature patterns 12 to 19 in the reference axis AX passing through the lateral edge 11e and the tip 11t, there is the second interval H2 between the second-one and the third-one of the feature patterns 12 to 19 in the reference axis AX, wherein the second interval H2 is different from the first interval H1, (2). the feature patterns 12 to 19 are asymmetrically arranged with respect to the reference axis AX. As a result, the geometrical relationship of the feature patterns 12 to 19 with respect to the tip 11t may be recognized. In addition, the first-one, the second-one and the third-one of the present embodiment are, for example, any different three of the feature patterns 12 to 19.

In the present embodiment, overlapping two of the feature patterns 12 to 19 of the measurement card 30 are eccentrically arranged. For example, the overlapping feature patterns 12 and 13 are eccentric, the overlapping feature patterns 14 and 15 are eccentric, the overlapping feature patterns 16 and 17 are eccentric, and the overlapping feature patterns 18 and 19 are eccentric. In another embodiment, the overlapping feature patterns may be eccentrically arranged in one feature pattern group, and the overlapping feature patterns may be concentrically arranged in another feature pattern group.

Figure 1D:
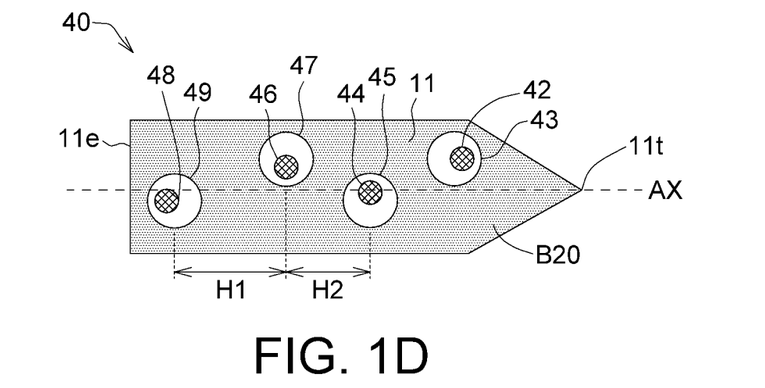

As shown in FIG. 1D, a measurement card 40 includes the main body 11, a plurality of feature patterns 42 to 49 and the background pattern B20. The main body 11 has the lateral edge 11e and the tip 11t opposite to the lateral edge 11e. The feature patterns 42 to 49 satisfy at least one of the following (1) and (2): (1). there is the first interval H1 between the first-one and the second-one of the feature patterns 42 to 49 in the reference axis AX passing through the lateral edge 11e and the tip 11t, there is the second interval H2 between the second-one and the third-one of the feature patterns 42 to 49 in the reference axis AX, wherein the second interval H2 is different from the first interval H1, (2). the feature patterns 42 to 49 are asymmetrically arranged with respect to the reference axis AX. As a result, the geometrical relationship of the feature patterns 42 to 49 with respect to the tip 11t may be recognized. In addition, the first-one, the second-one and the third-one of the present embodiment are, for example, any different three of the feature patterns 42 to 49.

In the present embodiment, overlapping two of the feature patterns 42 to 49 of the measurement card 40 are eccentrically arranged. In addition, one of the overlapping two feature patterns has a first grayscale value, and a region between the overlapping two feature patterns has a second grayscale value different from the first grayscale value. For example, a grayscale difference between the first grayscale value and the second grayscale value is at least 200, but may also be less than 200. In the present embodiment, the first grayscale value is smaller than the second grayscale value. For the overlapping feature patterns 42 and 43, the feature pattern 42 is an inner circle of black (the first grayscale value is 0), while the feature pattern 43 is an outer circle, and an annular area between the feature patterns 42 and 43 is white (the second grayscale value is 255). The overlapping feature patterns 44 and 45, the overlapping feature patterns 46 and 47, and the overlapping feature patterns 48 and 49 have the same or similar features, and they will not be repeated here.

Figure 1E:
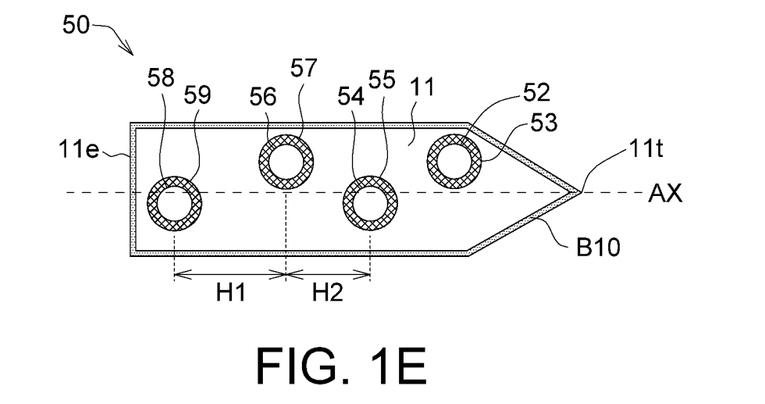

As shown in FIG. 1E, a measurement card 50 includes the main body 11, a plurality of feature patterns 52 to 59 and the background pattern B10. The main body 11 has the lateral edge 11e and the tip 11t opposite to the lateral edge 11e. The feature patterns 52 to 59 satisfy at least one of the following (1) and (2): (1). there is the first interval H1 between the first-one and the second-one of the feature patterns 52 to 59 in the reference axis AX passing through the lateral edge 11e and the tip 11t, there is the second interval H2 between the second-one and the third-one of the feature patterns 52 to 59 in the reference axis AX, wherein the second interval H2 is different from the first interval H1, (2). the feature patterns 52 to 59 are asymmetrically arranged with respect to the reference axis AX. As a result, the geometrical relationship of the feature patterns 52 to 59 with respect to the tip 11t may be recognized. In addition, the first-one, the second-one and the third-one of the present embodiment are, for example, any different three of the feature patterns 52 to 59.

In comparison with the measurement card 10 of FIG. 1A, the measurement card 50 of the present embodiment has a larger area between the overlapping two feature patterns. For the overlapping feature patterns 52 and 53, an annular region between the feature patterns 52 and 53 has an area larger than that of the annular region between the feature patterns 12 and 13 of FIG. 1A. The overlapping feature patterns 54 and 55, the overlapping feature patterns 56 and 57, and the overlapping feature patterns 58 and 59 have similar or identical features, and they will not be repeated here.

Figure 1F:
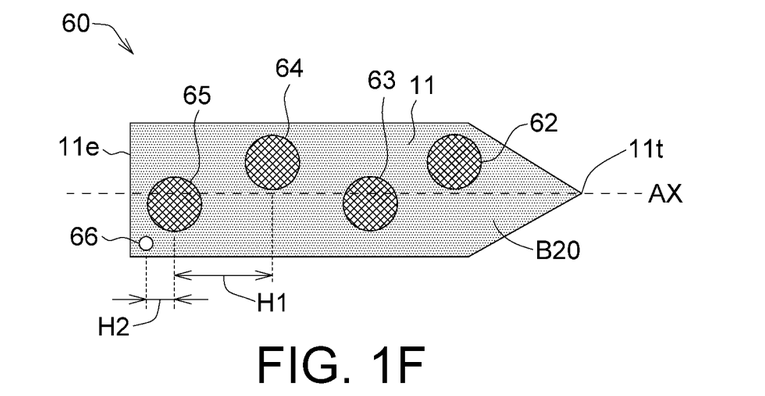

As shown in FIG. 1F, a measurement card 60 includes the main body 11, a plurality of feature patterns 62 to 65, an auxiliary pattern 66 and the background pattern B20. The main body 11 has the lateral edge 11e and the tip 11t opposite to the lateral edge 11e. The reference axis AX passes through the lateral edge 11e and the tip 11t. The feature patterns 62 to 65 are asymmetrically arranged with respect to the reference axis AX. As a result, the geometrical relationship of the feature patterns 62 to 65 with respect to the tip 11t may be recognized. The auxiliary pattern 66 may assist in determining the geometrical relationship of the feature patterns 62 to 65 with respect to the tip 11t. In the present embodiment, the auxiliary pattern 66 is different from the feature patterns 62 to 65, so the geometric relationship between the feature patterns 62 to 65 with respect to the tip 11t may be determined through the auxiliary pattern 66.

A shown in FIG. 1F, in the present embodiment, the feature patterns 62 to 65 do not overlap, for example, do not overlap at all. In addition, the background pattern B20 may be filled with the first color, and each of the feature patterns 62 to 65 may be filled with the second color different from the first color. For example, the first color is green, and the second color is blue or other color different from blue.

Figure 1G:
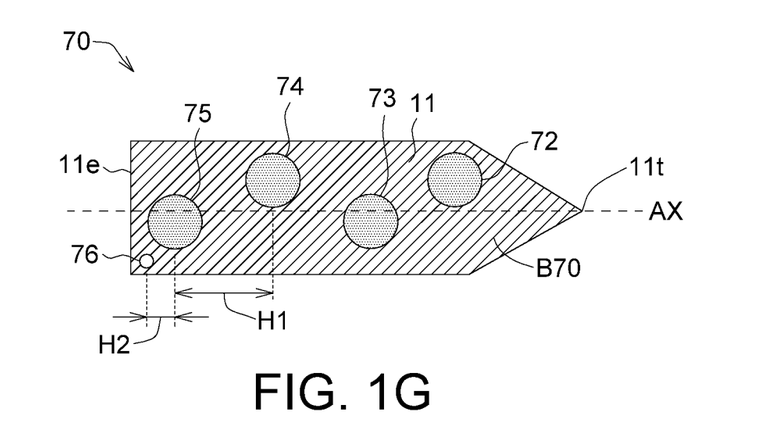

As shown in FIG. 1G, the measurement card 70 includes the main body 11, a plurality of feature patterns 72 to 75, an auxiliary pattern 76 and a background pattern B70. The main body 11 has the lateral edge 11e and the tip 11t opposite to the lateral edge 11e. The reference axis AX passes through the lateral edge 11e and the tip 11t. The feature patterns 72 to 75 are asymmetrically arranged with respect to the reference axis AX. As a result, the geometrical relationship of the feature patterns 72 to 75 with respect to the tip 11t may be recognized. The auxiliary pattern 76 may assist in determining the geometrical relationship of the feature patterns 72 to 75 with respect to the tip 11t. In the present embodiment, the auxiliary pattern 76 is different from the feature patterns 72 to 75, so the geometric relationship between the feature patterns 72 to 75 with respect to the tip 11t may be determined through the auxiliary pattern 76.

As shown in FIG. 1G, in the present embodiment, the feature patterns 72 to 75 do not overlap, for example, do not overlap at all. In addition, the background pattern B70 may be filled with the first color, and each of the feature patterns 72 to 75 may be filled with the second color different from the first color. For example, the first color is blue, and the second color is green or other color different from blue.

Figure 1H:
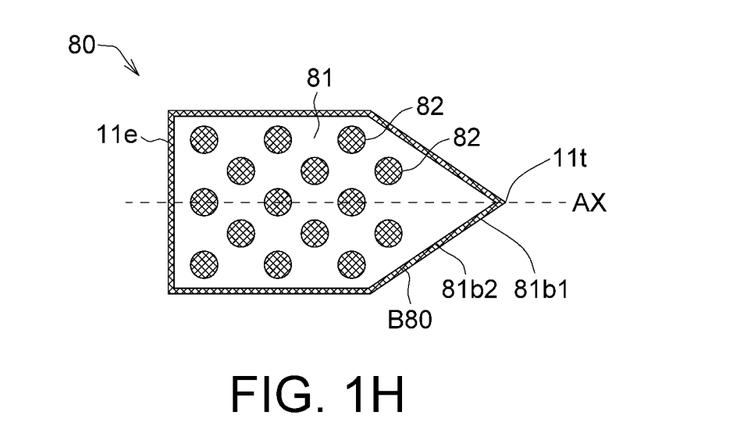

As shown in FIG. 1H, the measurement card 80 includes a main body 81, a plurality of feature patterns 82 and a background pattern B80. The main body 81 has the lateral edge 11e and the tip 11t opposite to the lateral edge 11e. Compared with the aforementioned measurement card 10, the main body 81 of the measurement card 80 of the present embodiment has an area different from that of the main body 11 of the measurement card 10. The reference axis AX passes through the lateral edge 11e and the tip 11t. The feature patterns 82 are asymmetrically arranged with respect to the reference axis AX. As a result, the geometrical relationship of the feature patterns 82 with respect to the tip 11t may be recognized.

As shown in FIG. 1H, the background pattern B80 is, for example, an edge frame of the main body 81. For example, the main body 81 has an outer boundary line 81b1 and an inner boundary line 81b2, and a region between the outer boundary line 81b1 and the inner boundary line 81b2 is defined as the background pattern B80. The background pattern B80 surrounds such feature patterns 82. The background pattern B80 may be filled with the first color, for example, black, but may also be other color. Each feature pattern 82 may be filled with the second color the same as the first color. For example, the first second color and the second color both are black. In another embodiment, the first color and the second color may be different. In the present embodiment, the feature patterns 82 and the background pattern B80 of the measurement card 80 are both grayscale patterns.

To sum up, a plurality of the feature patterns of the measurement card are arranged in at least four groups, overlapping two feature patterns may be regarded as one group, and two completely separated feature patterns may be regarded as two groups respectively. For the measurement cards 10 to 70 in FIGS. 1A to 1G, the feature patterns are arranged in four groups. When the number of groups of the feature patterns is less than four, the precision of the tip coordinate of the tip 11t analyzed based on the feature patterns is low. When the number of groups of the feature patterns is more than four, the amount of analysis data is large and the increasing of the accuracy is not obvious. The number of groups of the feature patterns in the present embodiment is four, and accordingly it may take into account the dual technical improvements of "high accuracy" and "fast analysis speed".

Figure 2:
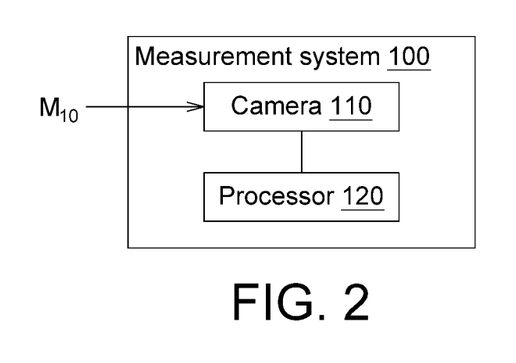
FIG. 2 shows a functional block diagram of the measurement system according to an embodiment of the present disclosure.

Referring to FIG. 2, FIG. 2 shows a functional block diagram of the measurement system 100 according to an embodiment of the present disclosure. The measurement system 100 includes a camera 110 and a processor 120. The camera 110 is configured for capturing a measurement card image of the measurement card, and the measurement card image includes a plurality of feature pattern images. The processor 120 is electrically connected to the camera 110 and configured for analyzing the feature pattern images to obtain the feature point coordinate of the feature point of each feature pattern image and inputting the feature point coordinates into a transformation matrix to obtain the tip coordinate of the tip of the measurement card.

The camera 110 is, for example, a color camera, a grayscale camera, an infrared (IR) camera, etc. The processor 120 is, for example, a physical circuit formed by using at least one semiconductor process.

The following further takes the measurement card 10 of FIG. 1A as an example to describe the process of using the measurement system 100 to obtain the tip coordinate of the tip 11t of the measurement card 10. The process of obtaining the tip coordinate using other types of measurement card images $M_{20}$ to $M_{80}$ is similar to or the same as that of obtaining the tip coordinate using the measurement card 10, and the similarities will not be repeated here.

Figure 3:
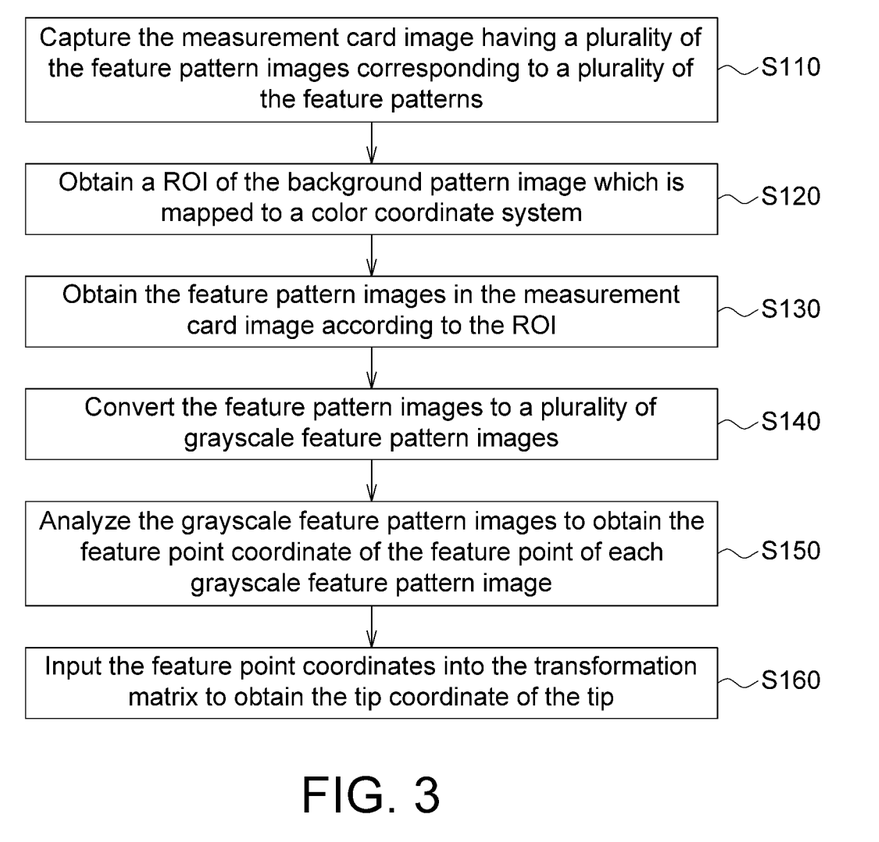
FIG. 3 shows a flow chart of a measurement method using the measurement system of FIG. 2.
Figure 4A:
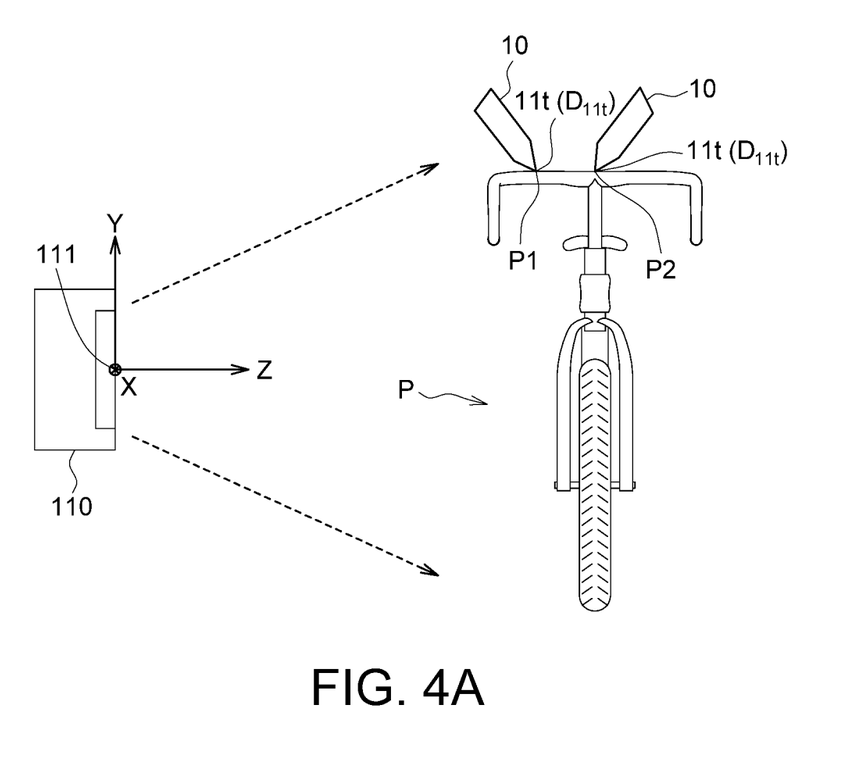
FIG. 4A shows a schematic diagram of the camera of FIG. 2 and the measurement card in space.
Figure 4B:
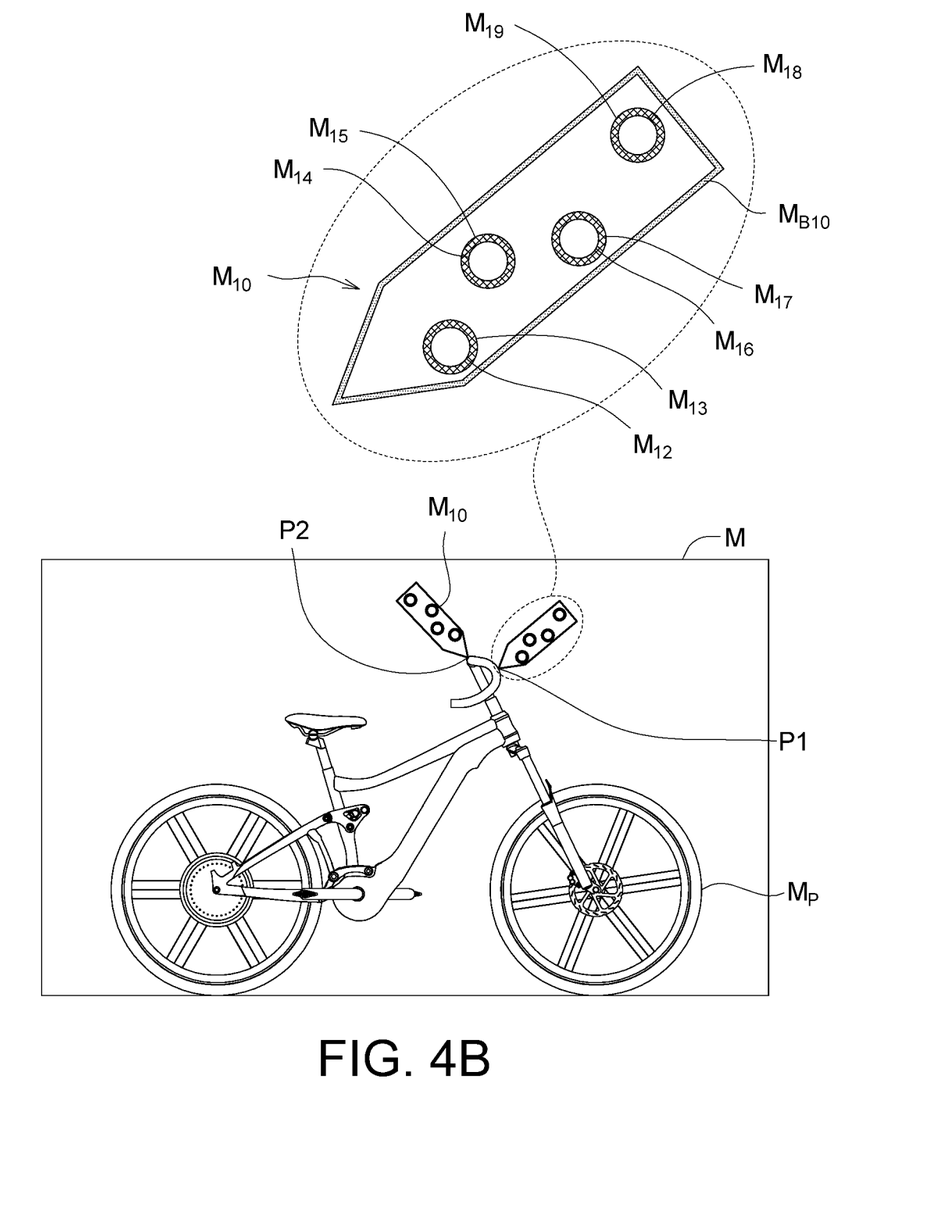
FIG. 4B shows a schematic diagram of a measurement card image captured by the camera of FIG. 4A.
Figure 4C:
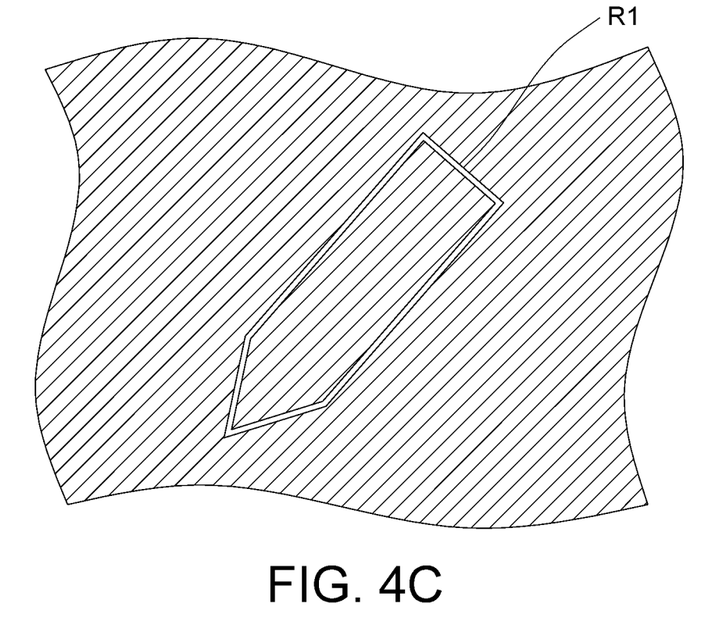
FIG. 4C shows a schematic diagram of a ROI of a background pattern image of FIG. 4B.
Figure 4D:
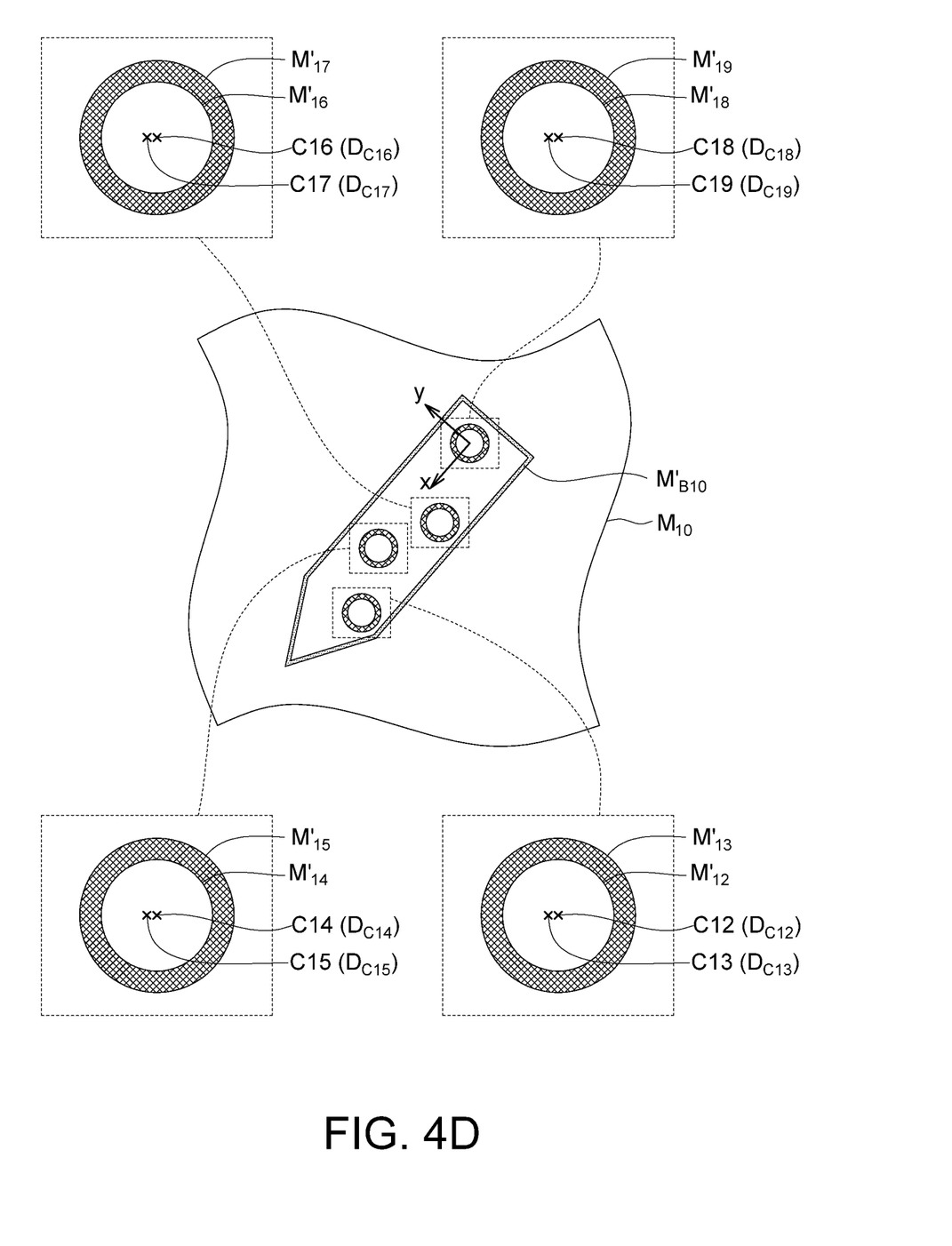
FIG. 4D shows a schematic diagram of the measurement card image of FIG. 4B obtained according to the ROI.
Figure 4E:
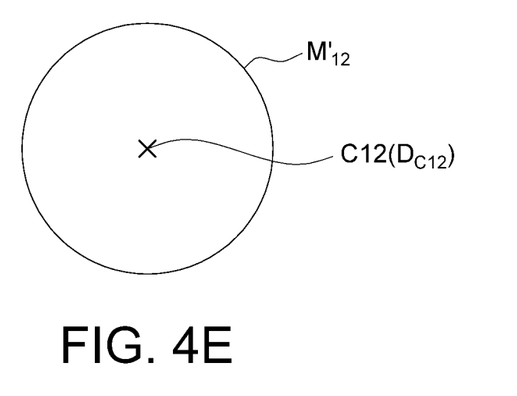
FIG. 4E shows a schematic diagram of a feature pattern image and a center thereof of FIG. 4D.
Figure 4F:
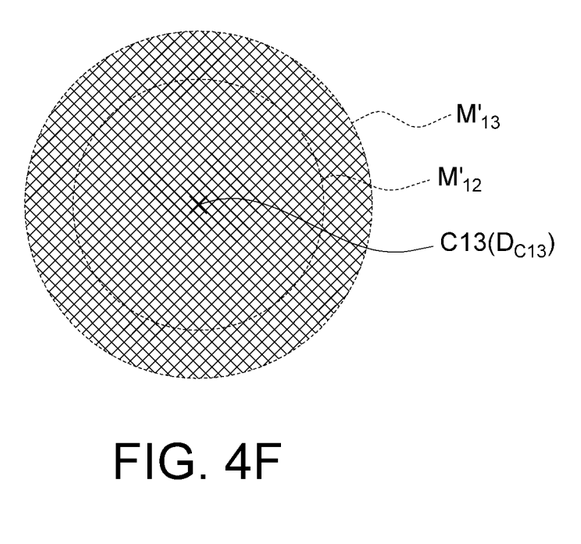
FIG. 4F shows a schematic diagram of a feature pattern image $M_{13}$ and a center thereof of FIG. 4D.

Referring to FIGS. 3 and 4A to 4F, FIG. 3 shows a flow chart of a measurement method using the measurement system 100 of FIG. 2, FIG. 4A shows a schematic diagram of the camera 110 of FIG. 2 and the measurement card 10 in space, FIG. 4B shows a schematic diagram of a measurement card image $M_{10}$ captured by the camera 110 of FIG. 4A, and FIG. 4C shows a schematic diagram of a ROI R1 of a background pattern image $M_{B10}$ of FIG. 4B, FIG. 4D shows a schematic diagram of the measurement card image $M_{10}$ of FIG. 4B obtained according to the ROI R1, FIG. 4E shows a schematic diagram of a feature pattern image $M_{12}$ and a center $C_{12}$ thereof of FIG. 4D, and FIG. 4F shows a schematic diagram of a feature pattern image $M_{13}$ and a center $C_{13}$ thereof of FIG. 4D.

In step S110, as shown in FIGS. 4A and 4B, the camera 110 may photograph a physical object P and at least one measurement card 10 to capture a captured image M. Although not shown, the measurement card 10 may be held by hand of the user, and a posture of the measurement card 10 is not limited. The physical object P is, for example, a vehicle frame, a workpiece, or other object that require dimensional measurement. The captured image M includes an object image $M_P$ corresponding to the physical object P, a measurement card image $M_{10}$ corresponding to the measurement card 10, etc. In the present embodiment, the number of the measurement cards 10 is two, and the tips 11t of the measurement cards 10 abut against the two position points P1 and P2 of the physical object P respectively. In another embodiment, the number of the measurement card 10 is one, and the tip 11t of the measurement card 10 abuts against a position point of the physical object. In other embodiments, the number of the measurement cards 10 is three or more, and the tips 11t of the measurement cards 10 may abut against three different positions of the physical object respectively.

As shown in FIG. 4B, the measurement card image $M_{10}$ has a plurality of the feature pattern images $M_{12}$ to $M_{19}$ corresponding to a plurality of the feature patterns 12 to 19 and the background pattern image $M_{B10}$ corresponding to the background pattern B10, and the background pattern image $M_{B10}$ surrounds the feature pattern images $M_{12}$ to $M_{19}$.

In the present embodiment, based on the shapes of the feature patterns 12 to 19, each of the feature pattern images $M_{12}$ to $M_{19}$ is a circle image, and each of the feature pattern images $M_{12}$ to $M_{19}$ has a feature point which is, for example, a center of the circle image. The feature pattern images $M_{12}$ to $M_{19}$ include a plurality of inner circle images and a plurality of outer circle images. For example, the feature pattern images $M_{12}$, $M_{14}$, $M_{16}$ and $M_{18}$ are, for example, the inner circle images corresponding to the feature patterns 12, 14, 16 and 18, and the feature pattern images $M_{13}$, $M_{15}$, $M_{17}$ and $M_{19}$ are, for example, the outer circle images corresponding to the feature pattern 13, 15, 17 and 19.

The processor 120 may perform image analysis on each measurement card image $M_{10}$ to obtain the feature point coordinates of the feature pattern image. The following describes the process of performing image analysis on one of the measurement card images $M_{10}$, the analysis methods of other measurement card image $M_{10}$ has the similar processes, and the similarities will not be repeated here.

In step S120, as shown in FIG. 4B, the processor 120 obtains a ROI (region of interest) R1 (as shown in FIG. 4C) of the background pattern image $M_{B10}$ which is mapped to a color coordinate system. The ROI R1 is the area of the background pattern image $M_{B10}$. For example, in the present embodiment, the background pattern image $M_{B10}$ is the edge frame of the main body 11, so the ROI R1 is an edge frame area corresponding to the background pattern image $M_{B10}$. In the present embodiment, the processor 120 performs image analysis on the pixels of the measurement card image $M_{10}$, and then generates the ROI R1 without changing the pixel information of the measurement card image $M_{10}$.

In the present embodiment, the aforementioned color coordinate system is, for example, HSV (Hue, Saturation, Lightness) chromaticity coordinates. The color of the background pattern image $M_{B10}$ may be expressed more stably (compared to the RBG chromaticity coordinates) in the HSV chromaticity coordinates, so the stability of the ROI R1 may be increased. That is, an error (or difference) between the ROI R1 obtained according to the color coordinate system and the background pattern image $M_{B10}$ of the measurement card image $M_{10}$ is very small, so that the ROI R1 may reflect an authenticity of the background pattern image $M_{B10}$.

In step S130, as shown in FIG. 4C, the processor 120 obtains the feature pattern images $M_{12}$ to $M_{19}$ and the background pattern image $M_{B10}$ in the measurement card image $M_{10}$ according to the ROI R1. Furthermore, the ROI R1 (corresponding to the background pattern image $M_{B10}$) surrounds all the feature pattern images $M_{12}$ to $M_{19}$, so that all the feature pattern images $M_{12}$ to $M_{19}$ of the surrounding area may be obtained (or framed) through the ROI R1.

In step S140, as shown in FIG. 4D, the processor 120 converts the feature pattern images $M_{12}$ to $M_{19}$ to a plurality of grayscale feature pattern images $M'_{12}$ to $M'_{19}$ and converts the background pattern image $M_{B10}$ to a grayscale background pattern image $M'B10$. The grayscale image pixels are grayscale colors, which have grayscale values ranging between 0 and 255. The grayscale image pixels may more easily recognize the circle feature pattern, which increases the accuracy.

In step S150, the processor 120 analyzes the grayscale feature pattern images $M'_{12}$ to $M'_{19}$ to obtain the feature point coordinate of the feature point of each of the grayscale feature pattern images $M'_{12}$ to $M'_{19}$. In the present embodiment, based on the shapes of the feature patterns 12 to 19, the feature point is, for example, the center of the grayscale feature pattern image, while the feature point coordinate is, for example, the center coordinate of the center of the grayscale feature pattern image.

For example, as shown in FIG. 4E, the processor 120 may perform the image analysis on the grayscale feature pattern image $M'_{12}$ to obtain a center coordinates $D_{C12}$ (feature point coordinate) of the center C12 (feature point) of the grayscale feature pattern image $M'_{12}$ by using an image processing technology. Then, as shown in FIG. 4F, the processor 120 may perform the image analysis on the grayscale feature pattern image $M'_{13}$ to obtain a center coordinate $D_{C13}$ of the center C13 of the grayscale feature pattern image $M'_{13}$ by using the image processing technology.

As shown in FIG. 4F, in an embodiment, before obtaining the center coordinate $D_{C13}$ of the center C13 of the grayscale feature pattern image $M'_{13}$, the processor 120 may set the grayscale value of the overlapping grayscale feature pattern image $M'_{12}$ to be the same as that of the grayscale feature pattern image $M'_{13}$. For example, if the grayscale value of a region between the grayscale feature pattern image $M'_{13}$ and the grayscale feature pattern image $M'_{12}$ is 0, the processor 120 also sets the grayscale value of the grayscale feature pattern image $M'_{12}$ to be 0. As a result, the accuracy of the obtained center coordinate $D_{C13}$ of the center C13 of the grayscale feature pattern image $M'_{13}$ may be increased. That is, there is a first relative geometric relationship between an outer boundary of the grayscale feature pattern image $M'_{13}$ and the center C13 thereof, and there is a second relative geometric relationship between an outer boundary of the feature pattern 13 and a center thereof, wherein a difference between the first relative geometric relationship and the second relative geometric relationship is very small (namely, excellent accuracy). In addition, the boundary outline of the grayscale feature pattern image $M'_{12}$ of FIG. 4F is shown for illustration only; however, the boundary outline of the grayscale feature pattern image $M'_{12}$ may not be displayed after the grayscale value of the grayscale feature pattern image $M'_{12}$ is set.

The processor 120 may obtain a center coordinates $D_{C14}$ of the center C14 of a grayscale feature pattern image $M'_{14}$, a center coordinates $D_{C15}$ of a center C15 of a grayscale feature pattern image $M'_{15}$, a center coordinates $D_{C16}$ of a center C16 of a grayscale feature pattern image $M'_{16}$, and a center coordinate $D_{C17}$ of a center C17 of a grayscale feature pattern image $M'_{17}$, a center coordinate $D_{C18}$ of a center C18 of a grayscale feature pattern image $M'_{18}$, and a center coordinate $D_{C19}$ of a center C19 of a grayscale feature pattern image $M'_{19}$ by using the same method, and the center coordinates and the centers are shown in FIG. 4D.

In addition, the measurement card image $M'_{10}$ refers to a first coordinate system x-y-z (the first coordinate system x-y-z is shown in FIG. 4D). For example, the processor 120 may set an origin of the first coordinate system to a center of one of the grayscale feature pattern images. The z-axis may be determined according to a right-hand coordinate system, which is not shown in FIG. 4D. In an embodiment, the processor 120 may set the center C18 of the grayscale feature pattern image $M'_{18}$ or the center C19 of the grayscale feature pattern image $M'_{19}$ as the origin of the first coordinate system. In an embodiment, the x-axis of the first coordinate system may be parallel to the reference axis AX, the y-axis is perpendicular to the x-axis, the x-y plane is a plane of the measurement card image $M'_{10}$, and the z-axis is perpendicular to the x-y plane. Since the grayscale feature pattern image is located on the x-y plane, the z-axis coordinate value of each point of the grayscale feature pattern image is 0. In another embodiment, an extension of the x-coordinate axis of the first coordinate system may intersect the reference axis AX.

In addition, the processor 120 may set a second coordinate system on the camera 110. For example, the processor 120 may set an origin of the second coordinate system X-Y-Z (the second coordinate system X-Y-Z is shown in FIG. 4A) at a lens center 111 of the camera 110. The aforementioned transformation matrix is a transformation relationship (rotation and/or translation) from the first coordinate system to the second coordinate system. In an embodiment, the first coordinate system is, for example, a world coordinate system, and the second coordinate system may also be referred to as a camera coordinate system. In an embodiment, the transformation matrix is obtained by using, for example, a coordinate transformation technique of two-dimensional (2D) to three-dimensional (3D). Furthermore, the rotation and translation (that is, a rotation matrix and a translation vector) between the camera 110 and the measurement card are obtained by using a Perspective-n-Point (PnP) pose computation from n pairs of feature image correspondence of 2D and 3D. However, the embodiments of the present disclosure do not limit the technology and/or method for obtaining the transformation matrix.

In step S160, the processor 120 may input the feature point coordinate of each of the grayscale feature pattern images $M'_{12}$ to $M'_{19}$ into the transformation matrix, and an output of the transformation matrix is the tip coordinate $D_{11t}$ of the tip 11t, wherein the tip coordinate $D_{11t}$ refers to the second coordinate system X-Y-Z. The second coordinate system X-Y-Z is a three-dimensional coordinate, in other words, the measurement system of the embodiment of the present disclosure may measure the geometric information of the physical object in the three-dimensional coordinate.

Each input to the transformation matrix corresponds to a specific-one of the grayscale feature pattern images. Since the relative geometric relationship of each of the grayscale feature pattern images $M'_{12}$ to $M'_{19}$ has been obtained (as described above), the processor 120 may input each of the grayscale feature pattern images $M'_{12}$ to $M'_{19}$ into the corresponding input of the transformation matrix, so that the transformation matrix outputs the tip coordinate $D_{11t}$ of the tip 11t.

After obtaining the tip coordinate $D_{11t}$ of one measurement card 10, the processor 120 may perform the same process to obtain the tip coordinate $D_{11t}$ of the next measurement card 10 until the tip coordinate $D_{11t}$ of all the measurement cards 10 is obtained. In addition, one coordinate of one position point of the physical object P may be obtained or known through one tip coordinate $D_{11t}$, a distance between two position points of the physical object P may be obtained or known through the two tip coordinates $D_{11t}$, and an angle included between two lines of the physical object P may be obtained or known through the three tip coordinates Dict. The processor 120 may determine the number of the tip coordinates $D_{11t}$, and obtain at least one tip coordinate $D_{11t}$ according to the number of the tip coordinates $D_{11t}$ to obtain the corresponding geometric information (position point, distance and/or angle, etc.). The aforementioned distances and the angles may be obtained by using suitable mathematical formulas.

To sum up, an embodiment of the present disclosure submits a measurement card, a measurement system and a measurement method using the same, the measurement card may abut against a position of a to-be-measured object, and a coordinates of a to-be-measured position may be easily and quickly obtained by the aforementioned measuring method with the aforementioned measurement system. In an embodiment, through the design of a plurality of the feature patterns of the measurement card (for example, symmetry or asymmetry, interval distribution, arrangement density, area size, etc.), the precise tip coordinate of the tip of the measurement card (corresponding to a spatial coordinate of the aforementioned to-be-measured point) may be obtained when the geometric information of the feature pattern image of the measurement card is obtained, so as to achieve precise dimension measurement or angle measurement of the to-be-measured object in space.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A measurement system, comprising:
    a camera configured for capturing a measurement card image of a measurement card, the measurement card comprises a main body and a plurality of feature patterns, wherein the main body has a lateral edge and a tip opposite to the lateral edge, the feature patterns are formed on the main body, and the feature patterns satisfy at least one of the following (1) and (2): (1). there is a first interval between a first-one and a second-one of the feature patterns in a reference axis passing through the lateral edge and the tip, there is a second interval between the second-one and a third-one of the feature patterns in the reference axis, wherein the second interval is different from the first interval; (2). the feature patterns are asymmetrically arranged with respect to the reference axis; the measurement card image comprises a plurality of feature pattern images corresponding to the feature patterns; and
    a processor electrically connected to the camera and configured to:
        analyze the feature pattern images to obtain a feature point coordinate of a feature point of each of the feature pattern images; and
        input the feature point coordinates into a transformation matrix to obtain a tip coordinate of the tip.

2. The measurement system according to claim 1, wherein the measurement card image has a background pattern image, and the background pattern image surrounds the feature pattern images; the processor is further configured to:
    obtain a region of interest (ROI) of the background pattern image which is mapped to a color coordinate system; and
    obtain the feature pattern images of the measurement card image according to the ROL.

3. The measurement system according to claim 2, wherein the color coordinate system is a HSV chromaticity coordinate.

4. The measurement system according to claim 1, wherein the processor is further configured to:
    convert the feature pattern images to a plurality of grayscale feature pattern images.

5. The measurement system according to claim 1, wherein each of the feature pattern images is a circle image; the processor is further configured to:
    obtain a center coordinate of a center of each of the circle images; and
    input the center coordinates into the transformation matrix to obtain the corresponding tip coordinate.

6. The measurement system according to claim 1, wherein the feature pattern images comprises a plurality of inner circle images and a plurality of outer circle images; the processor is further configured to:
    obtain a center coordinate of an inner circle of each of the inner circle images;
    obtain a center coordinate of an outer circle of each of the outer circle images; and
    input the center coordinates of the inner circles and the center coordinates of the outer circles into the transformation matrix to obtain the corresponding tip coordinate.

7. The measurement system according to claim 1, wherein the measurement card image refers to a first coordinate system, the tip coordinate refers to a second coordinate system, and the transformation matrix is a transformation relationship of the first coordinate system to the second coordinate system.

8. A measurement method, comprising:
    capturing a measurement card image of a measurement card by a camera, wherein the measurement card comprises a main body and a plurality of feature patterns, wherein the main body has a lateral edge and a tip opposite to the lateral edge, the feature patterns are formed on the main body, and the feature patterns satisfy at least one of the following (1) and (2): (1). there is a first interval between a first-one and a second-one of the feature patterns in a reference axis passing through the lateral edge and the tip, there is a second interval between the second-one and a third-one of the feature patterns in the reference axis, wherein the second interval is different from the first interval; (2). the feature patterns are asymmetrically arranged with respect to the reference axis; the measurement card image comprises a plurality of feature pattern images corresponding to the feature patterns;

analyzing the feature pattern images to obtain a feature point coordinate of a feature point of each of the feature pattern images; and inputting the feature point coordinates into a transformation matrix to obtain a tip coordinate of the tip.

9. The measurement method according to claim 8, wherein the measurement card image has a background pattern image, and the background pattern image surrounds the feature pattern images; the measurement method further comprising:

obtaining a ROI of the background pattern image which is mapped to a color coordinate system; and obtaining the feature pattern images of the measurement card image according to the ROL.

10. The measurement method according to claim 9, wherein the color coordinate system is a HSV chromaticity coordinate.

11. The measurement method according to claim 8, further comprising:

after obtaining the feature pattern images of the measurement card image according to the ROI, convert the feature pattern images to a plurality of grayscale feature pattern images.

12. The measurement method according to claim 8, wherein each of the feature pattern images is a circle image, and each of the feature points is a center of the corresponding circle image; analyzing the feature pattern images to obtain the feature point coordinate of the feature point of each of the feature pattern images further comprising:

obtaining a center coordinate of a center of each of the circle images;

wherein inputting the feature point coordinates into the transformation matrix to obtain the tip coordinate of the tip comprises:

inputting the center coordinates into the transformation matrix to obtain the corresponding tip coordinate.

13. The measurement method according to claim 8, wherein the feature pattern images comprises a plurality of inner circle images and a plurality of outer circle images; analyzing the feature pattern images to obtain the feature point coordinate of the feature point of each of the feature pattern images further comprising:

obtaining a center coordinate of an inner circle of each of the inner circle images; and obtaining a center coordinate of an outer circle of each of the outer circle images;

wherein inputting the feature point coordinates into the transformation matrix to obtain the tip coordinate of the tip comprises:

inputting the center coordinates of the inner circles and the center coordinates of the outer circles into the transformation matrix to obtain the corresponding tip coordinate.

\* \* \* \* \*